United States Patent [19]

Oishi

[11] Patent Number: 4,781,879

[45] Date of Patent: Nov. 1, 1988

[54] METHOD OF MAKING A MAGNETIC RECORDING DISK

[75] Inventor: Kengo Oishi, Odawara, Japan

[73] Assignee: Fuji Photo Film Co., Ltd., Japan

[21] Appl. No.: 931,937

[22] Filed: Nov. 18, 1986

[30] Foreign Application Priority Data

Nov. 19, 1985 [JP] Japan .................. 60-259564

[51] Int. Cl.⁴ .............................................. B29C 45/00
[52] U.S. Cl. .............................. 264/328.12; 264/328.8
[58] Field of Search ................ 264/106, 328.12, 328.8; 425/810

[56] References Cited

U.S. PATENT DOCUMENTS 3,880,978  4/1975  Apostoleris et al. .......... 264/328.12
4,403,933  9/1983  Davis et al. .................... 264/328.12

FOREIGN PATENT DOCUMENTS 0072840  5/1982  Japan ............................. 264/328.12

Primary Examiner—Jan H. Silbaugh
Assistant Examiner—Allan R. Kuhns
Attorney, Agent, or Firm—Pasquale A. Razzano

[57] ABSTRACT

A magnetic recording disk comprises a disk base which is provided with a central opening and an annular recess formed on at least one side thereof between the inner peripheral edge portion surrounding the central opening and the outer peripheral edge portion along the outer periphery of the disk base, and a flexible magnetic sheet which has a shape conforming to the shape of the disk base and is bonded to the disk base over the annular recess along the inner peripheral edge portion and the outer peripheral edge portion. The disk base is formed by injection molding of plastic material using a mold having a cavity provided with a central core for forming the central opening in the disk base and an annular protrusion which is coaxial with the central core and encircles the central core on the radial outside of a pin gate or pin gates through which molten resin is injected into the cavity so that an annular groove encircling the central opening is formed coaxially with the central opening.

2 Claims, 2 Drawing Sheets

METHOD OF MAKING A MAGNETIC RECORDING DISK

BACKGROUND OF THE INVENTION

1. Field of the Invention

This invention relates to a method of manufacturing a magnetic recording disk, and more particularly to a method of manufacturing a rigid magnetic recording disk formed by applying a flexible magnetic sheet to a surface of a rigid disk base.

2. Description of the Prior Art

There has been known a rigid magnetic recording disk comprising a rigid disk base of aluminum (e.g., JIS A5086) and a magnetic layer formed on a surface of the rigid disk base. The rigid magnetic recording disk is manufactured by machining the rigid disk base, polishing the surface of the machined rigid disk base, and forming a magnetic layer on the surface of the polished rigid disk base by vapor deposition, spincoating or the like.

Generally it is preferred that the surface of the magnetic recording disk is as smooth as possible in order to minimize the space between the disk surface and the magnetic head for recording and reproduction and to effect high density recording and reproduction. However, in the case of the rigid magnetic recording disk having an aluminum disk base, it has been very difficult to obtain a surface having a centerline average height of not larger than 0.1 $\mu$m. Further, since the disk base is rigid, it is difficult to continuously apply magnetic layers to disk bases, whereby disk manufacturing cost and manufacturing steps are increased.

Further, though the magnetic head must trace the magnetic layer of the disk while being spaced therefrom by a predetermined small distance during recording or reproduction, it is difficult, in the case of the rigid magnetic recording disk, to keep the small distance constant due to the lack of flexibility of the disk. Further, in the case of the conventional rigid magnetic recording disk, if the magnetic head is brought into contact with the magnetic layer, surface fracture can be produced in the magnetic layer due to the rigidity of the disk base, thereby shortening the service life of the disk. Accordingly, it is very difficult to reduce the distance between the magnetic layer and the magnetic head to further increase the recording density.

Further, the aluminum disk base itself is very expensive.

Thus, there has been proposed a magnetic recording disk comprising a rigid disk base 51 provided with a recess 54 on each side thereof and a floppy disk or a flexible disk 52 bearing a magnetic layer on one side thereof is applied to each side of the rigid disk base 51 over the recess 54 so that a space 53 is formed between the disk base 51 and each flexible disk 52 as shown in FIG. 4.

In the magnetic recording disk of this type, surface fracture of the magnetic layer is less apt to be produced if the magnetic head comes into accidental contact therewith or the magnetic head is brought into contact therewith in order to increase the recording density. Further, since the art of the flexible disk can be applied as it is, and the magnetic layer of the flexible disk which has a high durability and a smooth surface can be used as the magnetic layer, the problems inherent to the conventional rigid magnetic recording disks as described above can be avoided.

In the magnetic recording disk of this type, the manufacturing accuracy of the disk base need not be so high, and accordingly the disk base may be formed by injection molding of plastics or the like in order to improve productivity. When the disk base is formed by injection molding of plastics, the mold for molding the disk base is generally arranged so that molten plastic resin is injected into each cavity through a gate disposed at the center of the cavity to flow radially outwardly from the gate in order to prevent anisotropy being imparted to the molded disk base. The disk base must be provided with a central opening into which the driving shaft of a recording/reproducing system is to be fitted, and the central opening is machined after injection molding of the disk base.

However, this method is disadvantageous in that two steps are required for production of the disk base.

Though the disk base having the central opening can be manufactured only by injection molding step, molten resin must be injected into each cavity through a plurality of gates (which are generally pin gates) in order to avoid anisotropy being imparted to the molded disk base. For example, molten resin must be injected into each cavity through three pin gates 56a, 56b and 56c as shown in FIG. 5. The molten resin injected into the cavity through the three pin gates 56a to 56c fans out to fill the cavity as shown by arrows in FIG. 5. Accordingly, weldlines 57a, 57b and 57c are formed at portions at which the resin flows from the respective gates 56a to 56c encounter each other. The disk base 51 is apt to be strained along the weldlines 57a to 57c and to be lowered in strength along the weldlines 57a to 57c.

SUMMARY OF THE INVENTION

In view of the foregoing observations and description, the primary object of the present invention is to provide a method of manufacturing a rigid magnetic recording disk in which a disk base having the central opening can be molded without formation of a weldline.

In accordance with the present invention, the cavity for forming the disk base with the central opening is provided with a central core for forming the central opening in the disk base and an annular protrusion which is coaxial with the central core and encircles the central core on the radial outside of a pin gate or pin gates through which molten resin is injected into the cavity so that an annular groove surrounding the central opening is formed coaxially with the central opening. With this cavity arrangement, the molten resin injected into a cavity through the gate or gates spreads to fill first the space between the central core and the annular protrusion and then uniformly flows radially outward beyond the annular protrusion, whereby the disk base can be molded without formation of a weldline.

DESCRIPTION OF THE PREFERRED EMBODIMENTS

Figure 1:
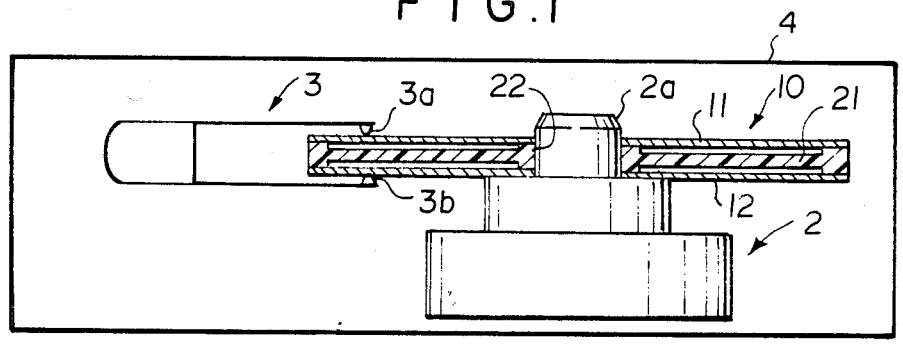
FIG. 1 is a cross-sectional view showing a magnetic recording disk manufactured by a method in accordance with an embodiment of the present invention, the disk being loaded in a recording/reproducing system.

In FIG. 1, a disk driving mechanism 2 and a recording/reproducing mechanism 3 are housed in a casing 4. The disk driving mechanism 2 has a driving shaft 2a and a magnetic recording disk 10 is brought into engagement with the driving shaft 2a. Magnetic heads 3a and 3b are disposed at opposite sides of the magnetic recording disk 10 while the magnetic recording disk 10 is rotated at a high speed, e.g., 3600 rpm, and the magnetic heads 3a and 3b trace the respective sides of the magnetic recording disk 10 for recording or reproduction with the magnetic heads 3a and 3b being spaced from the sides of the magnetic recording disk 10 by a small distance, e.g., 0.05 to 0.15 μm, by virtue of an air flow generated by the rotation of the disk 10.

The magnetic recording disk 10 comprises a disk base 21 having a central opening 22 of a predetermined diameter, and a pair of flexible magnetic sheets 11 and 12 applied one to each side of the disk base 21.

Figure 2:
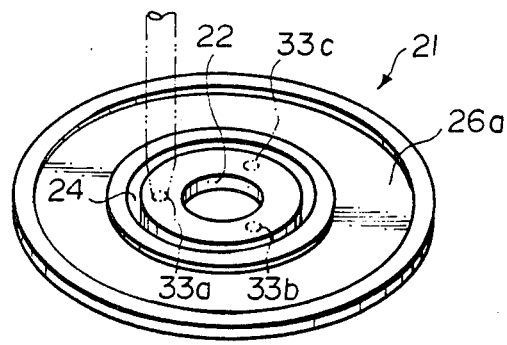
FIG. 2 is a perspective view of the disk base employed in the magnetic recording disk of FIG. 1.
Figure 3:
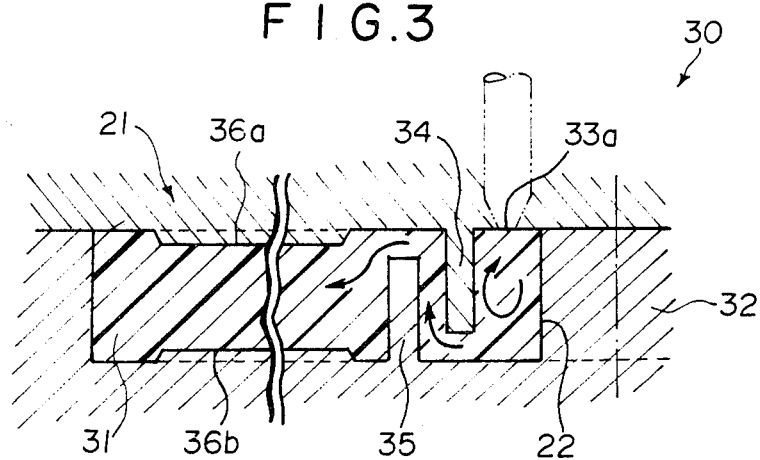
FIG. 3 is a fragmentary cross-sectional view of the mold for molding the disk base.
Figure 4:
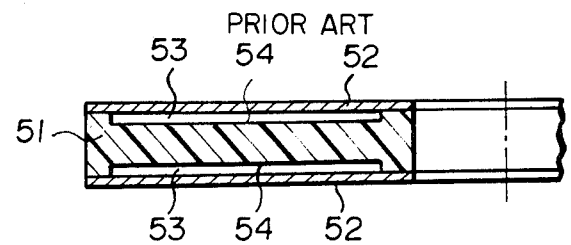
FIG. 4 is a fragmentary cross-sectional view of a magnetic recording disk manufactured in accordance with the prior art.
Figure 5:
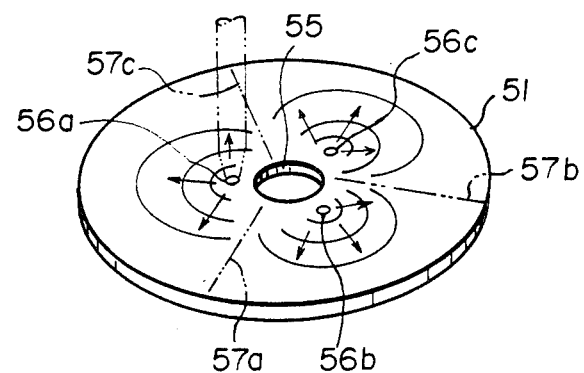
FIG. 5 is a perspective view of the disk base employed in the magnetic recording disk of FIG. 4.

The disk base 21 is formed by injection molding of plastic material. Injection molding of the disk base 21 will be described hereinbelow in detail with reference to FIGS. 2 and 3. Since the arm for supporting the magnetic heads 3a and 3b is generally formed of aluminum, and since the disk base 21 is preferably interchangeable with one formed of aluminum, the thermal expansion coefficient of the material of the disk base 21 is preferably approximate to that of the aluminum. A mold 30 for defining a cavity 31 for molding the disk base 21 has a central core 32 for forming the central opening 22 of the disk base 21, three pin gates 33a to 33c arranged around the central core 32 angularly equispaced from each other, a first annular protrusion 34 which is formed coaxially with the central core 32 on the outer side of the pin gates 33a to 33c to project from one side of the cavity 31 toward the other side, and a second annular protrusion 35 which is formed coaxially with the first annular protrusion 34 on the outer side thereof to project from said the other side of the cavity 31 toward said one side. Further, the mold 30 has a pair of wide and low annular protrusions 36a, 36b on opposite sides thereof. As shown in FIG. 2, the disk base 21 molded with the mold 30 has first and second annular grooves 24 and 25 and wide annular recesses 26a and 26b on opposite sides thereof. With this arrangement of the mold 30, the molten resin injected into the cavity 31 through the pin gates 33a to 33c is prevented from first flowing radially outwardly by the first annular protrusion 34 and first fills the space between the first annular protrusion 34 and the central core 32. After the space between the first annular protrusion 34 and the central core 32 is filled with the molten resin, the molten resin flows radially outwardly through a narrowed path defined by the first and second annular protrusions 34 and 35. This permits the molten resin to uniformly flow radially outwardly in substantially all directions, thereby preventing formation of a weldline.

The number of pin gates need not be limited to three but may be fewer or more. Further the number of annular protrusions may be one or more than one.

I claim:

1. A method of manufacturing a disk base for a magnetic recording disk, the disk base having a central opening surrounded by an inner peripheral edge portion, an outer peripheral edge portion along an outer periphery of the disk base, and a pair of annular grooved formed on opposite sides of the disk base coaxially with the central opening and between the inner peripheral edge portion and the outer peripheral edge portion, the magnetic recording disk having a flexible magnetic sheet which has a shape conforming to the shape of the disk base and is bonded to the disk base over an annular recess defined between the inner peripheral edge portion and the outer peripheral edge portion, said method comprising the steps of providing a mold defining a cavity around a center core which defines the central opening of the disk base, the mold including a first annular protrusion coaxial with the central core and projecting from one side of the mold into the cavity to define a first of the annular grooves; and including a second annular protrusion coaxial with the first annular protrusion and the central core and projecting from the other side of the mold into the cavity to define a second of the annular grooves; and injecting a plastic material into the mold cavity through at least one pingate located between the central core and the first annular protrusion and causing the plastic to fill the cavity, the plastic material first filling a portion of the cavity defined between the first annular protrusion and the central core, subsequently flowing radially outwardly through a narrowed path defined between the annular protrusion, and then filling the remainder of the mold cavity by flowing radially outwardly in substantially all directions, thereby preventing formation of a weldline.

2. A method as defined in claim 1 which said cavity is provided wherein said first and second annular protusions are of different diameters.

* * * * *